US011077945B2

(12) United States Patent
Kim et al.

(10) Patent No.: US 11,077,945 B2
(45) Date of Patent: Aug. 3, 2021

(54) REMOTE NFC DEVICE WITH AIRCRAFT IN-FLIGHT ENTERTAINMENT (IFE) SEATBACK

(71) Applicant: Panasonic Avionics Corporation, Lake Forest, CA (US)

(72) Inventors: Sang Hyup Kim, San Jose, CA (US); He Zheng, Irvine, CA (US); Nirav Patel, Buena Park, CA (US); Shawn Miller, Mission Viejo, CA (US)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 0 days.

(21) Appl. No.: 16/673,632

(22) Filed: Nov. 4, 2019

(65) Prior Publication Data

US 2021/0129993 A1 May 6, 2021

(51) Int. Cl.
*B64D 11/00* (2006.01)
*G06F 1/3203* (2019.01)
*H04W 4/80* (2018.01)
*H04L 29/12* (2006.01)

(52) U.S. Cl.
CPC .. *B64D 11/00155* (2014.12); *B64D 11/00153* (2014.12); *G06F 1/3203* (2013.01); *H04L 61/2007* (2013.01); *H04W 4/80* (2018.02)

(58) Field of Classification Search
CPC ....... B64D 11/00155; B64D 11/00153; H04W 4/80; G06F 1/3203; H04L 61/2007; H04N 21/2146; H04N 21/41422; H04N 21/214; H04N 21/414
See application file for complete search history.

(56) References Cited

U.S. PATENT DOCUMENTS

| 2003/0217363 | A1 | 11/2003 | Brady, Jr. et al. |
| 2013/0063612 | A1* | 3/2013 | Royster ............ H04N 21/43632 348/207.99 |
| 2014/0242910 | A1 | 8/2014 | Umlauft et al. |
| 2014/0282727 | A1* | 9/2014 | Keen .................. H04N 21/4126 725/37 |
| 2015/0126177 | A1 | 5/2015 | Bauer et al. |
| 2016/0311348 | A1* | 10/2016 | Watson ............... B60R 11/0229 |
| 2016/0344792 | A1* | 11/2016 | Sinivaara ......... H04N 21/43637 |
| 2018/0049005 | A1* | 2/2018 | Still .................... H04L 63/1425 |
| 2019/0190631 | A1 | 6/2019 | Gleditch et al. |

* cited by examiner

*Primary Examiner* — Alexander Gee
(74) *Attorney, Agent, or Firm* — Perkins Coie LLP

(57) ABSTRACT

Disclosed embodiments are directed at devices, methods, and systems for association of reader devices to IFE monitors in a commercial passenger vehicle. An example method includes determining at a client computing system included in an IFE monitor that at least one reader device is remotely located from the client computing system; using a wired Ethernet connection to a server, the client computing system requesting the server to discover an electronic tag information; and upon the client computing system receiving the electronic tag information from the server over the wired Ethernet connection, the client computing system processing the electronic tag information, wherein another IFE monitor supplies electrical power to the at least one reader device, wherein the client computing system is unaware of a physical location of the at least one reader device, and wherein the server is included in the another IFE monitor.

20 Claims, 9 Drawing Sheets

Android NFC Stack for Monitor Clients 1-4

X Server NFC Stack for Monitor Clients 1-4

US 11,077,945 B2

REMOTE NFC DEVICE WITH AIRCRAFT IN-FLIGHT ENTERTAINMENT (IFE) SEATBACK

TECHNICAL FIELD

This document is directed generally to association of reader devices to IFE monitors in commercial passenger vehicles.

BACKGROUND

Commercial travel has evolved to provide entertainment options to passengers traveling to their destinations. For example, in an airplane or train, entertainment options are provided on monitors located on the back of seats, where the monitors can enable passengers to watch movies, television shows, play games, and/or or listen to music as they travel to their destinations. Passengers can pay for their preferred options using the monitors. However, current implementations of monitors lack user-friendliness and ease of operation for carrying out passenger transactions.

SUMMARY

This patent document describes exemplary systems, devices, and methods directed at enabling associations involving a client computing system, a server, and a reader device in an commercial passenger vehicle environment. For example, the reader device can be connected on a hand rest of a passenger's seat, the server can be a computer associated with the passenger's seat, and the client computing system can be an in-flight entertainment (IFE) monitor. Based on a wired connection between the client computing system and the server, passenger transaction data can be sent from the server to its associated client computing system. Advantageously, the reader device can be remotely located from the client computing system and can be powered by electrical power from the server.

In one aspect, a system of communicating with a reader device in a commercial passenger vehicle is disclosed. The system comprises an in-flight entertainment (IFE) client configured to run on a first IFE monitor located at a first seat, the IFE client configured to: determine at the IFE client that at least one reader device is remotely located from the IFE client; using a wired Ethernet connection to a server, requesting the server to discover an electronic tag information; and upon the IFE client receiving the electronic tag information from the server over the wired Ethernet connection, the IFE client processing the electronic tag information, and wherein the IFE client is unaware of a physical location of the at least one reader device; and a second IFE monitor located at a second seat for supplying electrical power to the at least one reader device, where the second IFE monitor includes (or, is associated with) the server communicably coupled to the at least one reader device.

In another aspect, a computer-implemented method of communicating with a reader device in a commercial vehicle is disclosed. The method includes determining, at a client computing system associated with an in-flight entertainment (IFE) monitor that at least one reader device is remotely located from the client computing system; using a wired Ethernet connection to a server, the client computing system requesting the server to discover an electronic tag information, wherein the server is associated with another IFE monitor; and upon the client computing system receiving the electronic tag information from the server over the wired Ethernet connection, the client computing system processing the electronic tag information, wherein the another IFE monitor supplies electrical power to the at least one reader device, and wherein the client computing system is unaware of a physical location of the at least one reader device.

In a yet another aspect, a system of communicating with a reader device in a commercial passenger vehicle is disclosed. The system comprises an IFE client configured to run on an IFE monitor placed at a back of a passenger seat, the IFE client including instructions to: determine at the IFE client that at least one reader device is remotely located from the IFE client; using a wired Ethernet connection to a server, requesting the server to discover an electronic tag information; and upon the IFE client receiving the electronic tag information from the server over the wired Ethernet connection, the IFE client processing the electronic tag information, and wherein the IFE client is unaware of a physical location of the at least one reader device; and a line replacement unit located behind the seat, the line replacement unit supplying electrical power to the at least one reader device using a USB connection.

In a further aspect, a non-transitory computer-readable medium executable by a processor of a IFE monitor includes instructions in accordance with one or more of the methods disclosed herein.

In a yet further aspect, an IFE monitor comprising a memory and at least one processor can be configured to implement one or more of the methods disclosed herein.

DETAILED DESCRIPTION

Computing devices running platforms such as Android offer the ability of contactless payments, electronic ticketing, or generally transfer information using otherwise unpowered and passive electronic tags when brought in close proximity to a tag reader device. For example, when a mobile phone (e.g., employing Near Field Communications (NFC) technology) storing an electronic tag is brought in close proximity to a computing device, a reader integrated within the computing device reads the electronic tag from the mobile phone. That is, current implementations require a reader device to be integrated into a computing device running Android. As a result, a reader device is not remote from the computing device. Thus, there is a need for improved designs in which the reader device can be remotely located with respect to the computing device.

In many scenarios, e.g., passengers flying in airplanes use NFC-enabled cards to pay for food, beverage, and entertainment. Typically, a passenger brings his or her NFC-enabled credit card or mobile device (including tag information) close to an on-screen reader device attached to an in-flight entertainment (IFE) monitor in front of the passenger to make a payment. This may be cumbersome to passengers who might desire to use the hand rest or arm rest on their seat for payment activities. The present technology is directed at such scenarios. By attaching reader devices on the hand rest of passenger seats, the present technology allows flexibility in installing reader devices away from the front-facing IFE monitor, while facilitating use of the front-facing IFE monitor for viewing and listening entertainment. The front-facing IFE monitor is with respect to a passenger who sits behind a seat that has the IFE monitor at the back of the seat. Advantageously, by not having a power connection between the reader device and its associated front-facing IFE monitor, the present design allows reduced wiring resulting in lesser takeoff/liftoff weight and thereby producing savings in fuel costs.

Figure 1A:
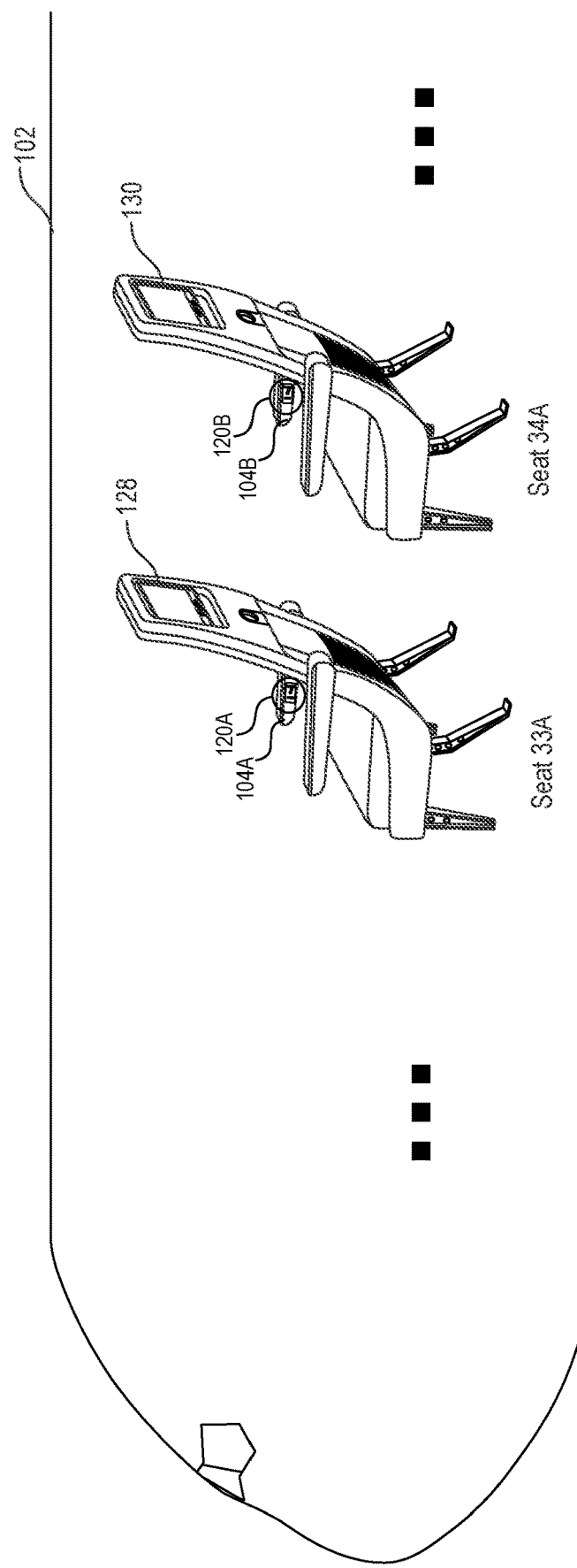
FIGS. 1A and 1B show exemplary overviews of operation of the disclosed technology.
Figure 1B:
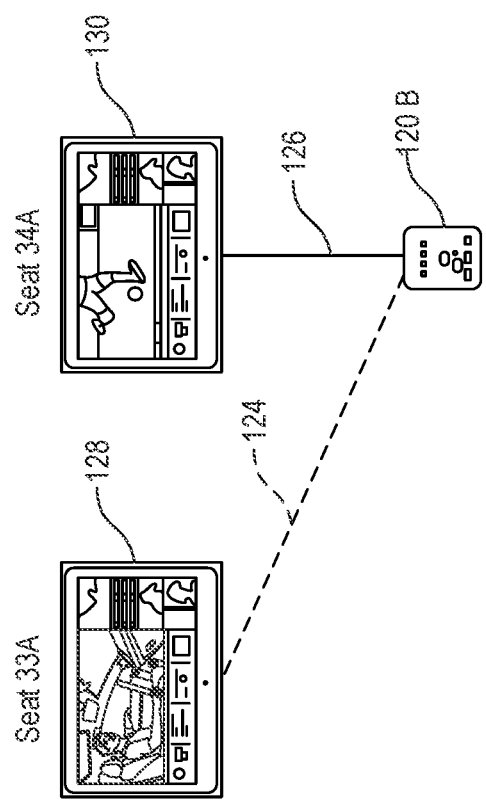

FIGS. 1A and 1B show exemplary overviews of operation of the disclosed technology. Specifically, FIG. 1A shows a pair of seats, having hypothetical seat numbers 33A, 34A in an airplane 102. Seat 33A has an IFE monitor 128. Seat 34A has an IFE monitor 130. Passengers sitting in seats 33A, 34A can use their respective IFE monitors 128, 130 for entertainment and/or viewing. Seats 33A, 34A can be aisle, row, middle or window seats, and located anywhere on the airplane, and associated with any flying class. Seats 33A, 34A have armrest (or, hand rest) 104A, 104B. Reader device 120A is located inside armrest 104A. Reader device 120B is located inside armrest 104B. In some embodiments, reader devices 120A, 120B are removably attachable from armrests 104A, 104B. In some embodiments, reader devices 120A, 120B are physically fixed to armrests 104A, 104B. According to the technology disclosed herein, reader devices are remotely located from its associated IFE monitor. For example, reader device 120B is communicably associated with a first IFE monitor (IFE monitor 128) while being remotely located from IFE monitor 128. In some embodiments, the reader device 120B receives electrical power from a power source in seat 34A.

Based on configuration information available to the IFE monitor 128 (generally synonymous with a client computing system inside IFE monitor 128), the IFE monitor 128 can determine that its associated reader device (reader device 120B) is remotely located. However, the IFE monitor 128 may not know the location of reader device 120B. Similarly, an IFE monitor associated with reader device 120A can determine that the reader device 120A is remotely located but may not know the actual location of reader device 120A. Similar settings can apply to one or more other seats in the airplane 102.

When a passenger sitting on seat 34A wishes to make a purchase, he/she can bring a credit card or mobile device in close proximity to reader device 120B. The passenger's credit card or mobile device can include radio frequency (RF) tags with the passenger's credit card information or otherwise any user data. Reader device 120B can periodically or intermittently scan for radio frequency (RF) tags. Upon detecting a tag nearby, the reader device 120B can read the tag to extract the user data. After a one-time registration step between a client running on the IFE monitor 128 and a server running on IFE monitor 130, in which the client running on the IFE monitor 128 pings the reader device 120B, the reader device 120B is considered to be paired with its associated IFE monitor (e.g., IFE monitor 128) and can send the passenger's user data to the IFE monitor 128.

FIG. 1B shows details of associations of reader device 120B. Specifically, FIG. 1B shows reader device 120B connected to IFE computers 128, 130 via links 124, 126. According to some embodiments, link 124 can be a wired Ethernet link for carrying data and no power. According to some embodiments, link 126 can be a wired USB link for delivering electrical power from IFE monitor 130 to the reader device 120B. In some embodiments, the reader device 120B is solely powered by the IFE monitor 130. Thus, although the IFE monitor 128 is associated with the reader device 120B for data exchange (e.g., using NFC communications), the IFE monitor 128 may not supply electrical power to the reader device 120B. Because the IFE monitor 128 exchanges data with the reader device 120B, the IFE monitor 128 can be viewed as "using" the reader device 120B, e.g., in accordance with a master-slave hierarchy. FIG. 1B also shows the IFE monitor 130 displaying different content than the IFE monitor 128.

Although FIG. 1A shows the IFE monitor 128 located at a seat immediately in front of reader device 120B, in alternate embodiments, a reader device can be located any number of seats behind or adjacent its associated IFE monitor. Furthermore, although FIG. 1A shows a single reader device on a hand rest, in some embodiments, the IFE monitor using or controlling the reader device can support other peripheral devices for power and/or data. The peripheral devices can be connected to their master IFE monitor by USB connections. For example, there can be terminals for reading chip-based credit cards, or a jukebox/music server to transfer/play music.

Figure 2:
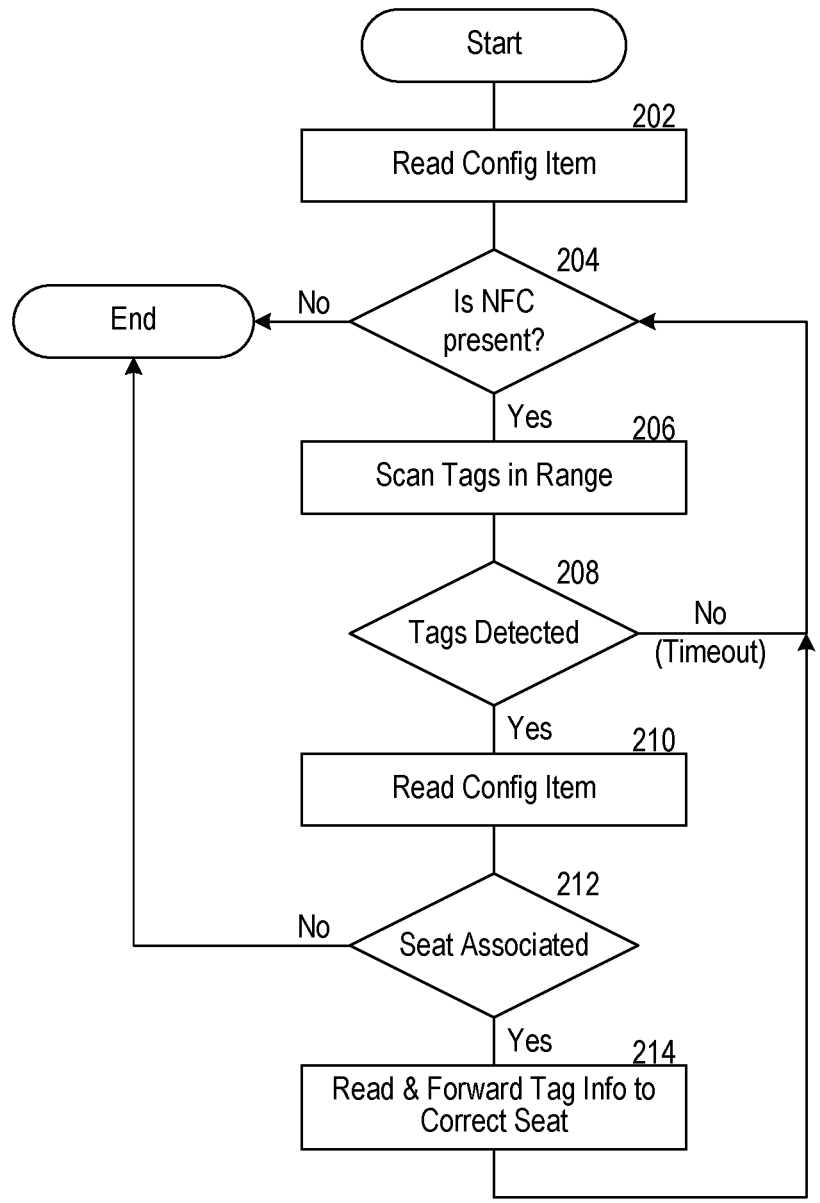
FIG. 2 shows an exemplary sequence flow diagram illustrating operation of the disclosed technology.

FIG. 2 shows an exemplary sequence flow diagram illustrating operation of the disclosed technology. In some embodiments, an IFE monitor computer (e.g., running the Android operating system and located above, underneath, or inside a seat of an airplane seat) reads (step 202) a configuration information item to determine (step 204) whether a reader device (e.g., a NFC reader) is present or not, i.e., regardless of the location of the reader device. If the IFE monitor determines that no reader device is attached, then the sequence flow ends. However, if the IFE monitor determines that the reader device is remotely located, the flow moves to the next step. At step 206, a reader device wirelessly scans the air for RFID tags or NFC tags in close proximity to the reader device, the tags including user data, or credit card information. Typically, a reader device scans one tag at a time to determine whether or not a tag is detected (step 208). If no tag is detected, after a delay (timeout), the flow reverts back to step 204, and the process resumes. However, if a reader device detects a tag, the sequence proceeds to step 210, where the IFE monitor reads a configuration information to determine its wired IP address. The wired IP address can be a dynamically-configurable IP address assigned to the IFE monitor by a headend server, e.g., when either the headend server and/or the IFE monitor restarts or reboots. Without knowledge of a physical location of the reader device, the IFE monitor pings a server connected to the reader device to create an association (step 212). It will be appreciated that this association process (to find the "correct" seat) is usually performed once between an IFE monitor and its reader device as a one-time registration/pairing. For subsequent communications, the IFE monitor uses the wired Ethernet connection to receive user data from its associated reader device. Accordingly, the reader device sends (step 214) the scanned tag information to the IFE monitor via the wired Ethernet connection. Advantageously, in some embodiments, the reader device does not receive electrical power from its associated IFE monitor. Rather, in those embodiments, the reader device receives electrical power solely from another power source distinct from the associated IFE monitor. This power source can be another IFE monitor or it can be a seat electrical box (SEB). For example, a SEB can provide electrical power to the last row of seats. Thus, the reader device can be connected to an IFE monitor for data transfer (but not power) and a power source separate from the IFE monitor for power (but not data). In some implementations, every reader device in an airplane can be connected in the manner described above. Furthermore, in such implementations, a given reader device can be connected to a hand rest or arm rest of an airplane associated with, or corresponding to the power source. In some implementations, the last row of seats do not have IFE monitors on the back of the seats, and hence, those seats may not run any clients.

Figure 3:
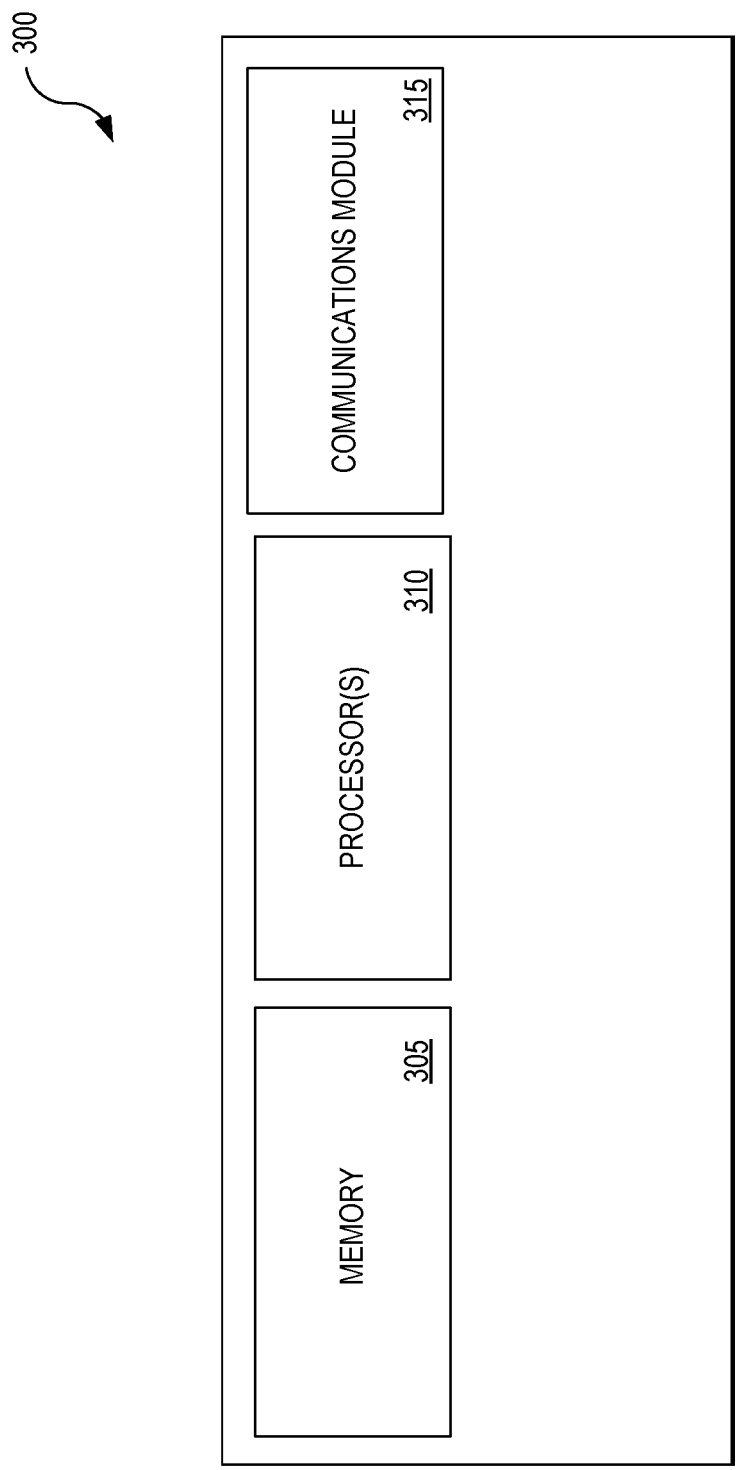
FIG. 3 shows an example IFE monitor.

FIG. 3 shows an example IFE monitor. For example, FIG. 3 shows that an IFE monitor includes at least one processor 310, at least one memory 305 storing instructions thereupon to perform the operations in the various embodiments described in this patent document, and a communications module 315. The processor 310 executes the instructions stored in the memory 305. The communications module 315 enables communications with a remotely located reader device for registration and subsequent communications. For example, based upon reading configuration information (e.g., sent by a headend computer), the communications module 315 can use an IP address of the IFE monitor on a wired Ethernet (e.g., TCP/IP) connection for communications with a remotely located reader device. The communications module 315 is also configured to send a ping message to the remotely located reader device and receive an acknowledgment back in response to the ping message. The communications module 315 receives payment data, user data, credit card data, etc. from the remotely located reader device during operation. These data can be in connection with purchases made by a passenger traveling in the airplane.

Figure 4A:
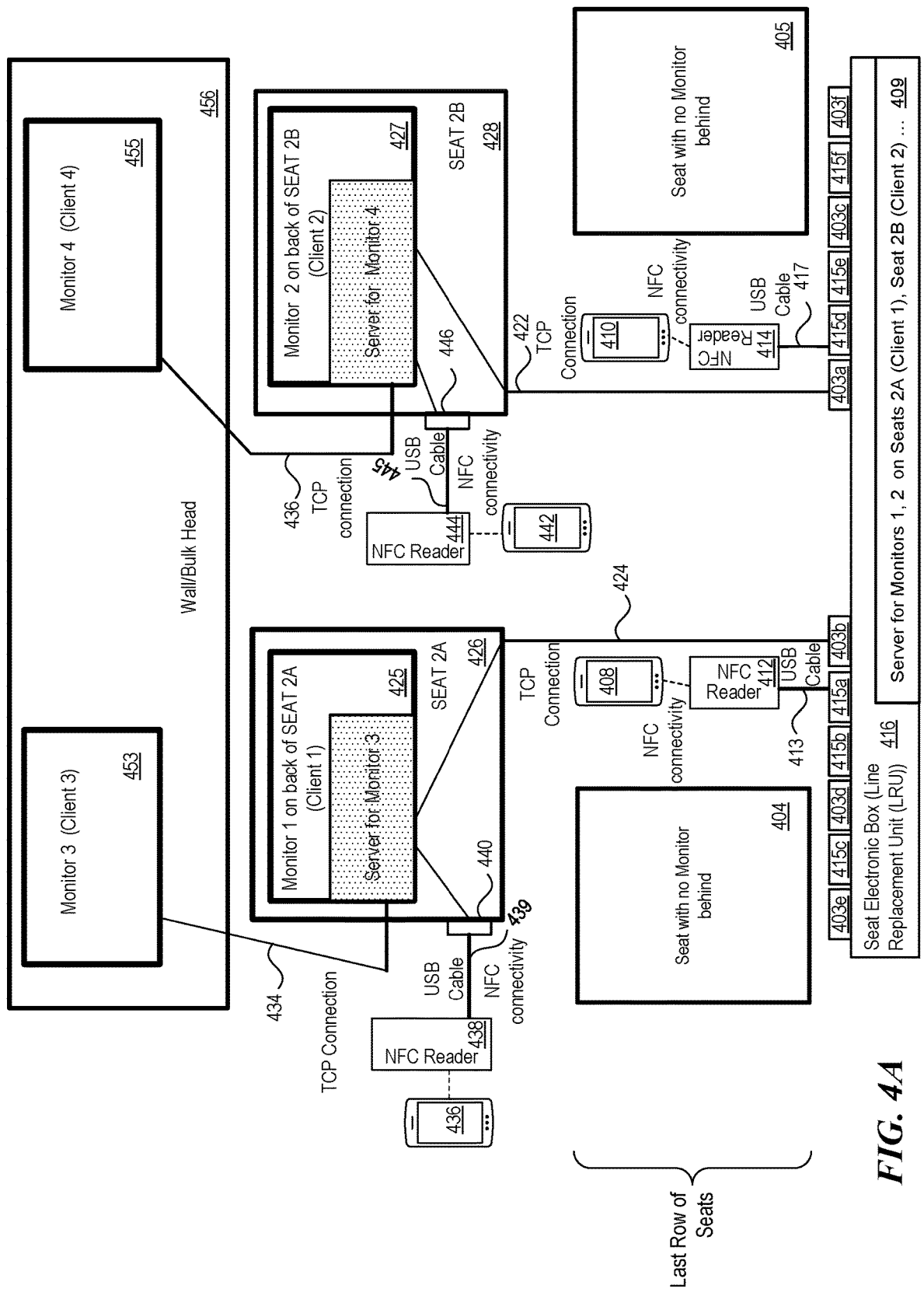
FIG. 4A is a block diagram illustrating components which, in some implementations, can be used in a system employing the disclosed technology.

FIG. 4A is a block diagram illustrating components which, in some implementations, can be used in a system employing the disclosed technology. For example, FIG. 4A shows the last row of seats (e.g., seat 404 and 405) in an airplane that do not have an IFE monitor at the back of the seats. Seats 404 and 405 have arm rests to which NFC reader devices 413 and 417 are removably attached. NFC reader devices 412 and 414 receive electrical power supplied by SEB 416 (alternatively referred to herein as line replacement unit (LRU)). Reader devices 412 and 414 can read (in a P2P mode) NFC tag information stored on mobile devices 408 and 410. Examples of mobile devices 408 and 410 can be cellular phones, laptops, tablet computers, smart watches, head gear devices, wearable consumer devices, or otherwise any electronic device. In some embodiments, NFC tag information can be stored on credit cards, in which case a NFC reader can read the tag information from the credit card. SEB 416 includes a server 409 (e.g., a NFC server) for IFE monitors 1 and 2 located at the back of seat 2A and seat 2B respectively. SEB 409 can also provide TCP connections 424 and 422. In some implementations, SEB 409 can provide a plurality of USB ports (e.g., USB ports 415a, 415b, 415c on the left and 415d, 415e, 415f on the right) and a plurality of TCP connection ports (e.g., 403b, 403d, 403e on the left and 403a, 403c, 403f on the right). The plurality of USB ports and the plurality of TCP connection ports can be used to provide electrical power and network connectivity to electrical components and/or devices associated with seats (e.g., including the last row of seats) in an airplane.

TCP connections 424 and 422 are wired Ethernet connections that provide network connectivity to IFE monitor 1 (located on the back of seat 2A) and IFE monitor 2 (located on the back of seat 2B). IFE monitor 1 and IFE monitor 2 (respectively denoted 426 and 428 in FIG. 4A) are configured to run respective clients 1 and client 2. IFE monitor 1 includes a server that is associated with monitor 3 (denoted 453 in FIG. 4A). IFE monitor 2 includes a server that is associated with monitor 4 (denoted 455 in FIG. 4B). Although the server for monitor 3 is included in IFE monitor 1 and the server for monitor 4 is included in IFE monitor 2, these servers are "associated" or "paired" with client 3 and 4 running on IFE monitors 3 and 4 located in the wall/bulk head portion 456 of the airplane.

The armrests of respective seats 2A and 2B include removably attachable NFC reader devices 438 and 444. In some embodiments, reader devices 438 and 444 receive electrical power solely from IFE monitors 1 and 2, although reader devices 438 and 444 are paired with remote clients 3 and 4. Clients 3 and 4 (alternatively referred to herein as client computing systems) can be NFC clients that use wired TCP connections 434 and 436 to communicate with their respective servers located inside IFE monitors 1 and 2. IFE monitors 1 and 2 provide electrical power to NFC reader devices 438 and 444 respectively. Via USB connections 439 and 445. Mobile devices 436 and 442 can be personal electronic devices of passengers storing NFC tag information, which can be read by NFC reader devices 438 and 444 respectively.

It will be understood that in alternate embodiments, other components and modules can be involved in the above interactions. Further, the above-mentioned modules can be suitably modified to include additional components/functions and some components/functions can be removed. Furthermore, in alternate embodiments, other radio communication protocols besides NFC can be used. Also, FIG. 4A illustrates two rows of seats located behind a bulk head. In alternate implementations, there can be multiple rows of seats (and even multiple aisles) between the bulk head and the seat electronic box.

Figure 4B:
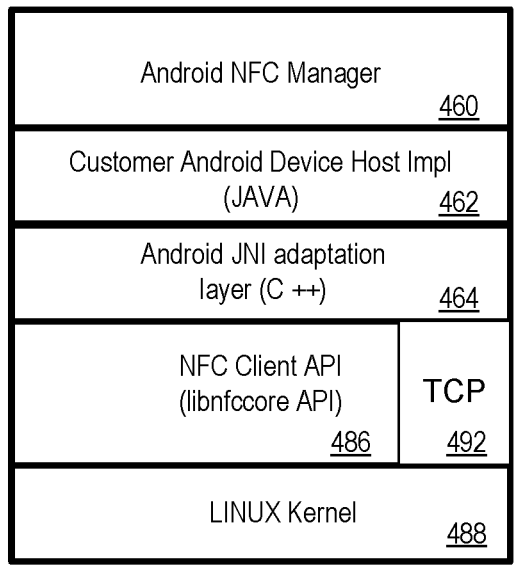
FIG. 4B shows a first software stack implemented by an IFE monitor.
Figure 4C:
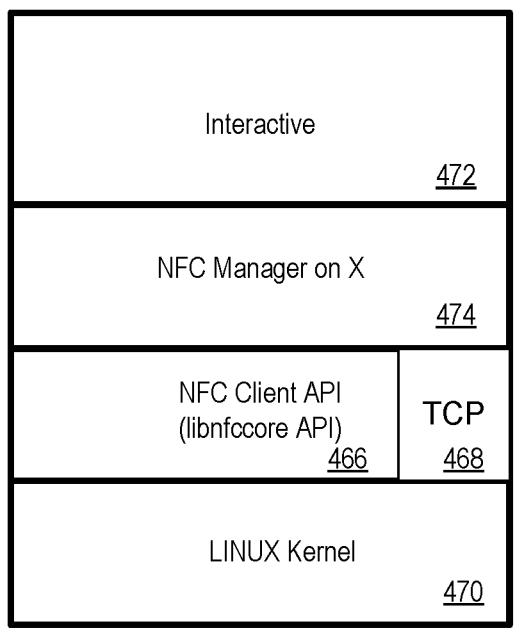
FIG. 4C shows a second software stack implemented by an IFE monitor.

FIG. 4B shows a first software stack implemented by an IFE monitor. For example, IFE monitor clients numbered 1-4 in FIG. 4A can implement the first software stack. The first software stack (alternatively termed as the Android NFC stack) includes multiple modules. The Android NFC stack allows software development associated with reading NFC tags (alternatively termed as NDEF) when a NFC tag (or, a device including NFC tag is brought in close proximity to a reader device). For example, the Android NFC stack includes an Android NFC manager 460, a customer Android device host implementation 462, an Android JNI adaptation layer 464, a NFC client API 466, and a Linux kernel 470. Android NFC manager 460 can maintain a list of connected NFC readers and serves NFC client API 486. NFC client API can handles functionalities of reading NFC tag information and send the NFC tag information securely to NFC manager 460. Customer Android device host implementation 462 includes custom programs and/or applications that the airline company intends to offer passengers. For example, the custom programs and/or applications can be written using the JAVA programming language. Android JNI adaptation layer 464 (e.g., written using the C++ programming language) allows interoperability of applications by enabling interactions with one or more libraries written in other programming languages. NFC client API 486 (generally synonymous with client computing system) is connected to a NFC reader for data exchange. In some embodiments, one NFC client is mapped to one NFC reader. FIG. 4C shows NFC client API 486 connected to a TCP module 492 for exchange of NFC tag information over a TCP connection associated with TCP module 492. Linux kernel 488 includes various software for operation of the IFE monitor. For example, Linux kernel 488 can act as a bridge between hardware on the IFE monitor and software stored in a memory of the IFE monitor.

FIG. 4C shows a second software stack implemented by an IFE monitor. For example, IFE monitor clients numbered 1-4 in FIG. 4A can implement the second software stack. The second software stack (alternatively termed as the X server NFC stack) includes multiple modules. The X server is an X Window system display server that provides a basis for Graphical User Interface (GUI) capabilities. It can be used to create a hardware abstraction layer where software is written to use general commands, allowing for device independence and reuse of programs. For example, the second software stack can include an interactive module 472, a NFC manager module 474, a NFC client API 466, and a Linux kernel 470. Interactive module 472 can include custom programs and/or applications that the airline company intends to offer passengers, thereby allowing a passenger to interact with the front-facing IFE monitor with respect to the seat of the passenger. NFC manager 474 can maintain a list of connected NFC readers and serves NFC client API 466. NFC client API 466 (generally synonymous with client computing system) is connected to a NFC reader for data exchange. In some embodiments, one NFC client is mapped to one NFC reader. FIG. 4C shows NFC client API 466 connected to a TCP module 468 for exchange of NFC tag information over a TCP connection associated with TCP module 468. Linux kernel 470 includes various driver programs and software for operation of the IFE monitor. For example, Linux kernel 470 can act as a bridge between hardware on the IFE monitor and software stored in a memory of the IFE monitor.

Figure 4D:
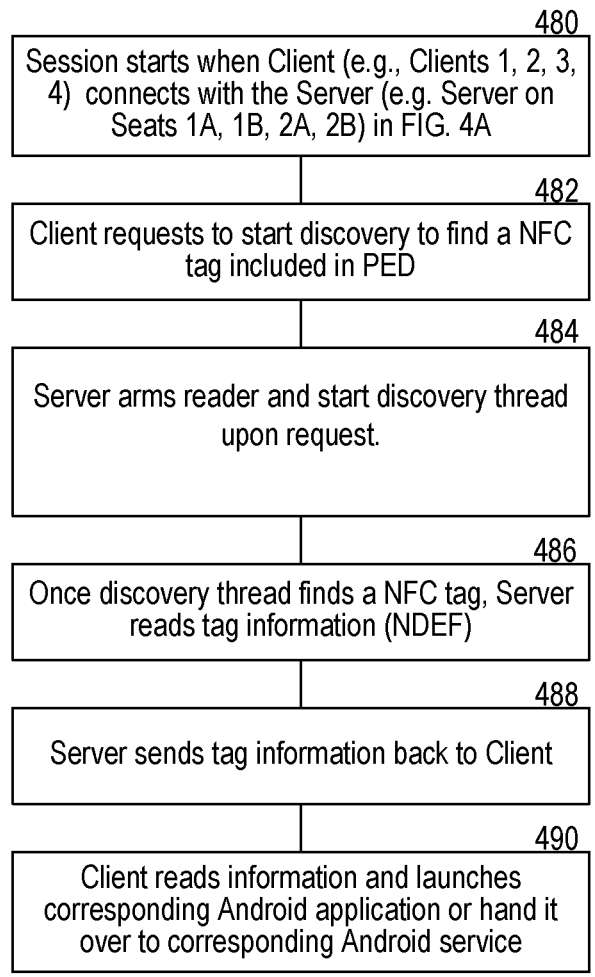
FIG. 4D shows a flow diagram illustrating example steps implemented by an IFE client and a server.

FIG. 4D shows a flow diagram illustrating example steps implemented by an IFE client and a server. At step 480, a session starts when a client computing system (in an IFE monitor) connects to a server (in another IFE monitor or in a Seat Electronic Box located behind the passenger's seat). At step 482, the client computing system requests the server to start a discovery thread for a NFC tag included in a personal electronic device (such as a passenger's mobile phone, laptop, wearable electronic device, or tablet computer). Upon receiving the request from the client computing system, at step 484, the server (communicably coupled to the reader device) powers or arms the reader device. The server also starts the discovery thread to find a NFC tag. When a passenger sitting in an airplane seat facing the IFE monitor brings his or her personal electronic device close to the reader device, the reader device scans the NFC tag information from the passenger's personal electronic device. Accordingly, at step 486, the discovery thread finds a NFC tag. The server reads the tag information of the NFC tag. At step 488, the server sends the tag information to the client computing system. At step 490, the client computing system reads the tag information and launches a corresponding Android™ application or otherwise hands over the tag information to a corresponding Android™ service.

Figure 4E:
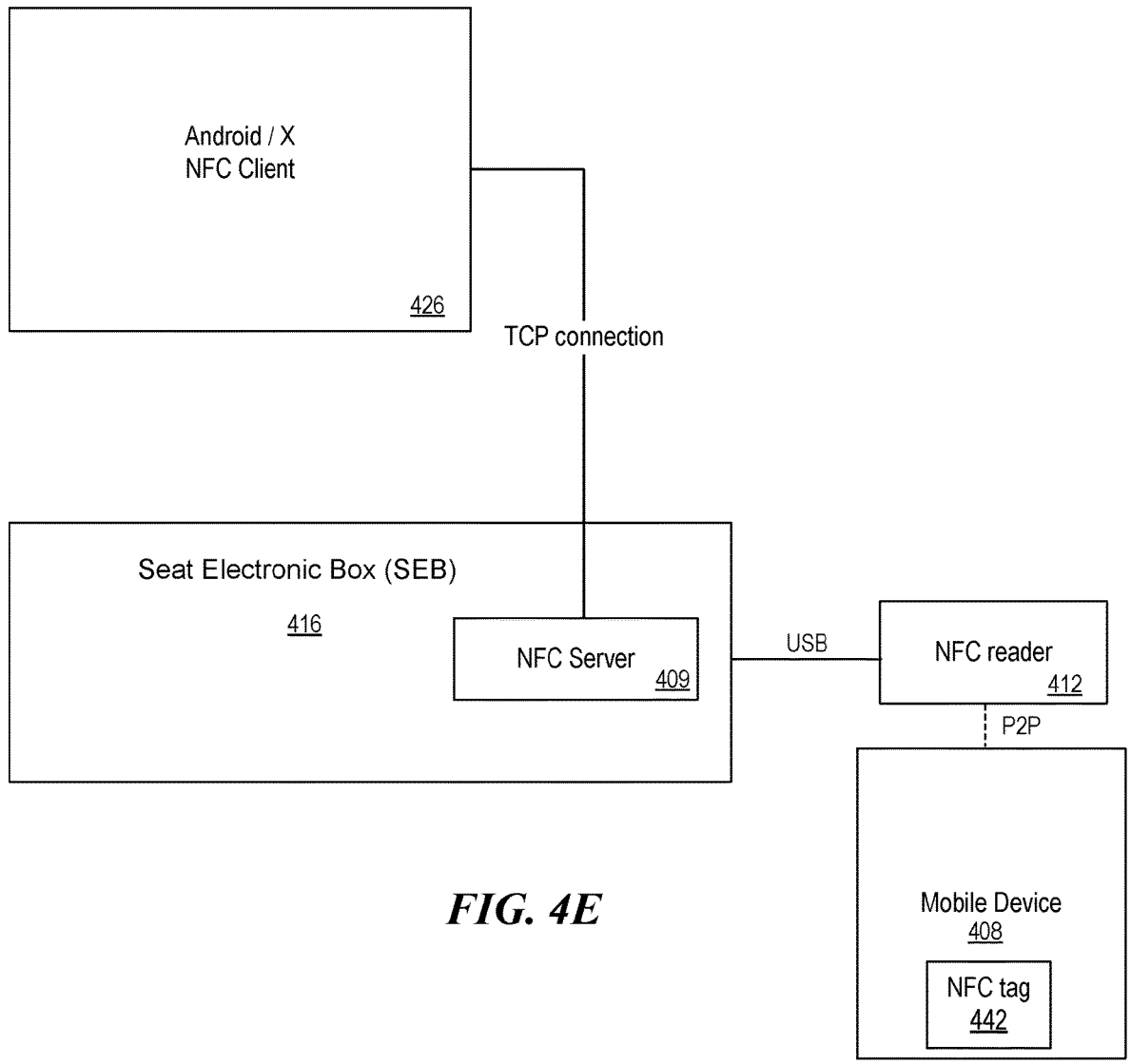
FIG. 4E shows a SEB (Seat Electronic Box) implementation corresponding to FIG. 4A.

FIG. 4E shows a SEB (Seat Electronic Box) implementation corresponding to FIG. 4A. For example, the SEB implementation can be used in the last row of seats on an airplane because the SEB is typically located behind the last row of seats and there are no IFE monitors located behind the last row of seats. In FIG. 4E, SEB 416 includes a NFC server 409. SEB 416 is connected to NFC reader 412 via a USB connection. NFC reader 412 can be connected (e.g., according to a P2P operating mode) to a personal electronic device (mobile device 408) of the passenger or aircrew member sitting at a last seat in the last row. Mobile device 408 includes NFC tag 442. NFC tag 442 can include credit card data, payment data, or other types of user transaction data. FIG. 4E shows NFC server 409 connected to a NFC client 426 via a wired Ethernet connection (e.g., a TCP/IP connection). Upon receiving NFC tag 442 from NFC reader 412, NFC server 409 sends NFC tag 442 over the wired Ethernet connection to NFC client 426. For example, NFC server 409 can create a discovery thread so that NFC reader 412 is able to find/scan NFC tag 442 from mobile device 408. In some embodiments client 426 can be configured to run the Android™ operating system or the X server operating system.

Figure 5:
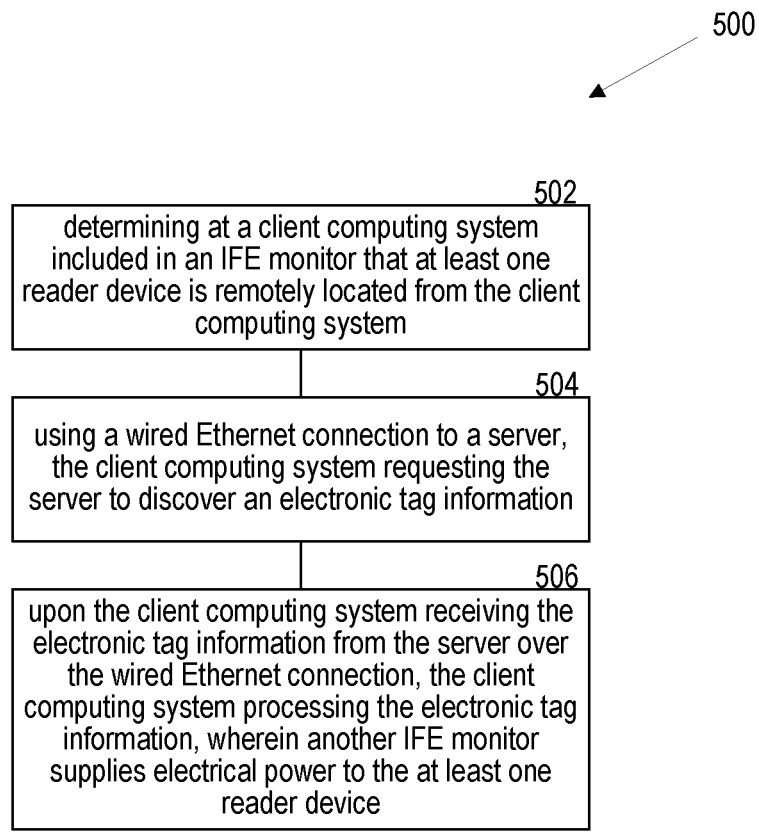
FIG. 5 shows an example method implemented at an IFE monitor for communicating with a remote reader device.

FIG. 5 shows an example method 500 of communicating with a remotely-located reader device. For example, the steps of method 500 can be implemented by a client computing system configured to run on an IFE monitor. At step 502, the client computing system determines (e.g., based on configuration information from a headend server) that at least one reader device is remotely located from the client computing system. At step 504, the client computing system requests a server to discover an electronic tag information. The request can be sent via a wired Ethernet connection between the IFE monitor and the reader device. In response to the request, the client computing system can receive tag information from the server over the wired Ethernet connection. The electronic tag information can be user transaction data included in a passenger's mobile device. At step 506, the client computing system processes the received tag information. The server communicably coupled to the reader device can be included in another (e.g., a second) IFE monitor and the reader device can receive electrical power (e.g., using a USB connection) from the second IFE monitor. In some embodiments, the first IFE monitor (i.e., the IFE monitor running the client computing system) is unaware of a physical location of the reader. In some implementations, the server in the second IFE monitor is the sole supplier of electrical power to the reader device.

In some embodiments, the configuration information available to a client running on a first IFE monitor includes an unique identification of the second IFE monitor that supplies the electrical power to the reader device. In some implementations the configuration information available to a client running on a first IFE monitor includes an unique identification of a line replacement unit (LRU) (or, the server contained there within).

In some embodiments, configuration information can be available to a client running on the second IFE monitor. The configuration information can include an unique identification of the reader device that receives electrical power from the second IFE monitor. This configuration information can be made available from a headend computer. In some embodiments, the configuration information can include a unique identification of a client that is served by a server included in the second IFE monitor.

As used herein, the term "client computing system" can be applicable for hardware and/or software components. Thus, based on the context, it can be applicable for a IFE monitor or an application program running on the IFE monitor.

Although the example embodiments discussed herein are with respect to airplanes, the disclosed technology is applicable to other commercial passenger vehicles such as trains, buses, ferries, or other modes of commercial travel.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this patent document.

What is claimed is:

1. A system of communicating with a reader device in a commercial passenger vehicle comprising:
   an in-flight entertainment (IFE) client configured to run on a first IFE monitor located at a first seat, the IFE client including instructions to:
      determine at the IFE client that at least one reader device is remotely located from the IFE client;
      using a wired Ethernet connection to a server, requesting the server to discover an electronic tag information; and
      upon the IFE client receiving the electronic tag information from the server over the wired Ethernet connection, the IFE client processing the electronic tag information, and wherein the IFE client is unaware of a physical location of the at least one reader device; and
   a second IFE monitor located at a second seat for supplying electrical power to the at least one reader device, where the second IFE monitor includes the server communicably coupled to the at least one reader device.

2. The system of claim 1, wherein the second seat is located immediately behind the first seat, and the reader device is removably coupled to a hand rest of the second seat.

3. The system of claim 1, wherein the instructions to determine that the at least one reader device is remotely located from the IFE client includes a self-identification by the IFE client as being a part of the first IFE monitor.

4. The system of claim 1, wherein the instructions to determine that the at least one reader device is remotely located from the IFE client includes reading a configuration information available to the IFE client.

5. The system of claim 1, wherein using the wired Ethernet connection includes a use of an Internet Protocol (IP) address assigned to the IFE client.

6. The system of claim 5, wherein the IP address is a dynamically-configurable network address.

7. The system of claim 1, wherein the IFE client includes further instructions to:
   upon processing the electronic tag information, launch an application program associated with the electronic tag information.

8. The system of claim 7, wherein the electronic tag information corresponds to user transaction data received from a mobile device wirelessly coupled to the at least one reader device.

9. The system of claim 8, wherein the mobile device is wirelessly coupled to the at least one reader device using near field communications (NFC).

10. A computer-implemented method of communicating with a reader device in a commercial passenger vehicle, comprising:
    determining, at a client computing system associated with an inflight entertainment (IFE) monitor that at least one reader device is remotely located from the client computing system;
    using a wired Ethernet connection to a server, the client computing system requesting the server to discover an electronic tag information, wherein the server is associated with another IFE monitor; and
    upon the client computing system receiving the electronic tag information from the server over the wired Ethernet connection, the client computing system processing the electronic tag information,
    wherein the another IFE monitor supplies electrical power to the at least one reader device, where the another IFE monitor includes the server communicably coupled to the at least one reader device.

11. The method of claim 10, wherein the determining that the at least one reader device is remotely located from the client computing system client includes a self-identification by the client computing system as being a part of the IFE monitor, further comprising:
    identifying that the at least one reader device is connected to the server, wherein the IFE monitor is located at a back portion of a passenger seat, and wherein the another IFE monitor is located immediately behind the passenger seat associated with the IFE monitor.

12. The method of claim 10, wherein the determining that the at least one reader device is remotely located from the client computing system client includes a self-identification by the client computing system as being a part of the IFE monitor, further comprising:
    identifying that the at least one reader device is connected to the server, wherein the IFE monitor is located at a bulk head portion of the commercial passenger vehicle, and wherein the another IFE monitor is located immediately behind the bulk head portion associated with the IFE monitor.

13. The method of claim 10, wherein the determining that the at least one reader device is remotely located from the client computing system includes reading a configuration information available to the client computing system.

14. The method of claim 10, wherein the determining that the at least one reader device is remotely located from the client computing system corresponds to the at least one reader device removably attached to a hand rest of a seat that is located immediately behind a seat associated with the IFE monitor.

15. A system of communicating with a reader device in an commercial passenger vehicle comprising:

an IFE client configured to run on an IFE monitor placed at a back of a passenger seat, the IFE client including instructions to:
  determine at the IFE client that at least one reader device is remotely located from the IFE client;
  using a wired Ethernet connection to a server, requesting the server to discover an electronic tag information; and
  upon the IFE client receiving the electronic tag information from the server over the wired Ethernet connection, the IFE client processing the electronic tag information, and wherein the IFE client is unaware of a physical location of the at least one reader device; and
a line replacement unit located behind the seat, the line replacement unit supplying electrical power to the at least one reader device using a USB connection, where the line replacement unit includes the server communicatively coupled to the at least one reader device.

16. The system of claim 15, wherein the line replacement unit is located immediately behind the seat, and the at least one reader device is removably coupled to a hand rest of the seat.

17. The system of claim 15, wherein the instructions to determine that the at least one reader device is remotely located from the IFE client includes a self-identification by the IFE client as being a part of the IFE monitor.

18. The system of claim 15, wherein the instructions to determine that the at least one reader device is remotely located from the IFE client includes reading a configuration information available to the IFE client.

19. The system of claim 15, wherein using the wired Ethernet connection includes a use of an Internet Protocol (IP) address assigned to the IFE client.

20. The system of claim 15, wherein the at least one reader device is a near field communications (NFC) device, and wherein, a user transaction data received at the NFC device is sent to the IFE client by the server over the wired Ethernet connection.

* * * * *